United States Patent [19]
Roylance

[11] Patent Number: 5,687,058
[45] Date of Patent: Nov. 11, 1997

[54] METHOD AND APPARATUS FOR REDUCING AT LEAST ONE DIMENSION OF A COMPUTER KEYBOARD FOR TRANSPORTATION AND STORAGE

[75] Inventor: William H. Roylance, Salt Lake County, Utah

[73] Assignee: Mallinckrodt & Mallinckrodt, Salt Lake City, Utah

[21] Appl. No.: 540,651

[22] Filed: Oct. 11, 1995

[51] Int. Cl.$^6$ ................................. G06F 1/16; H05K 5/02
[52] U.S. Cl. ................................. 361/680; 400/682
[58] Field of Search ................... 361/679, 680; 345/168, 169; 400/489, 682, 691, 692, 693; 312/208.1, 208.4; 341/22; 364/708.1; G06F 1/16

[56] References Cited

U.S. PATENT DOCUMENTS

| | | | |
|---|---|---|---|
| 3,940,758 | 2/1976 | Margolin | 340/337 |
| 5,141,343 | 8/1992 | Roylance et al. | 400/472 |
| 5,187,644 | 2/1993 | Crisan | 361/393 |
| 5,267,127 | 11/1993 | Pollitt | 361/680 |
| 5,457,453 | 10/1995 | Chiu et al. | 341/22 |
| 5,519,569 | 5/1996 | Sellers | 361/680 |
| 5,539,615 | 7/1996 | Sellers | 361/680 |

*Primary Examiner*—Leo P. Picard
*Assistant Examiner*—Lynn D. Feild
*Attorney, Agent, or Firm*—Mallinckrodt & Mallinckrodt

[57] ABSTRACT

A method and apparatus is described for reducing the width of a keyboard, such as a keyboard of a portable computing device, for folding the keyboard from a first width of the keyboard in operative position to a second width of the keyboard in a storage position. The keyboard has a plurality of keyboard sections each having a plurality of keys, where the operative position of the keyboard has the sections disposed in a line. The keyboard folds such that the keyboard sections are vertically adjacent to each other. The keys of the keyboard sections are compressed for storage to take up their travel and thereby conserve storage volume as well as storage width. Multiple implementations are disclosed, including keyboards that fold such that the keys of one section are in contact with the keys of another section, and keyboards that fold such that the keys are not in contact with keys of another section.

13 Claims, 12 Drawing Sheets

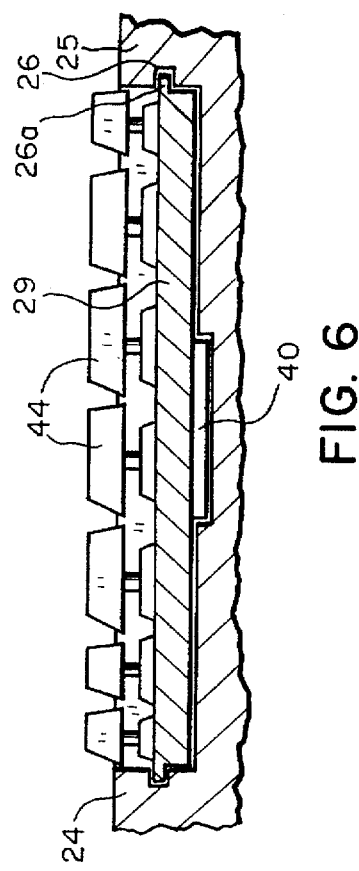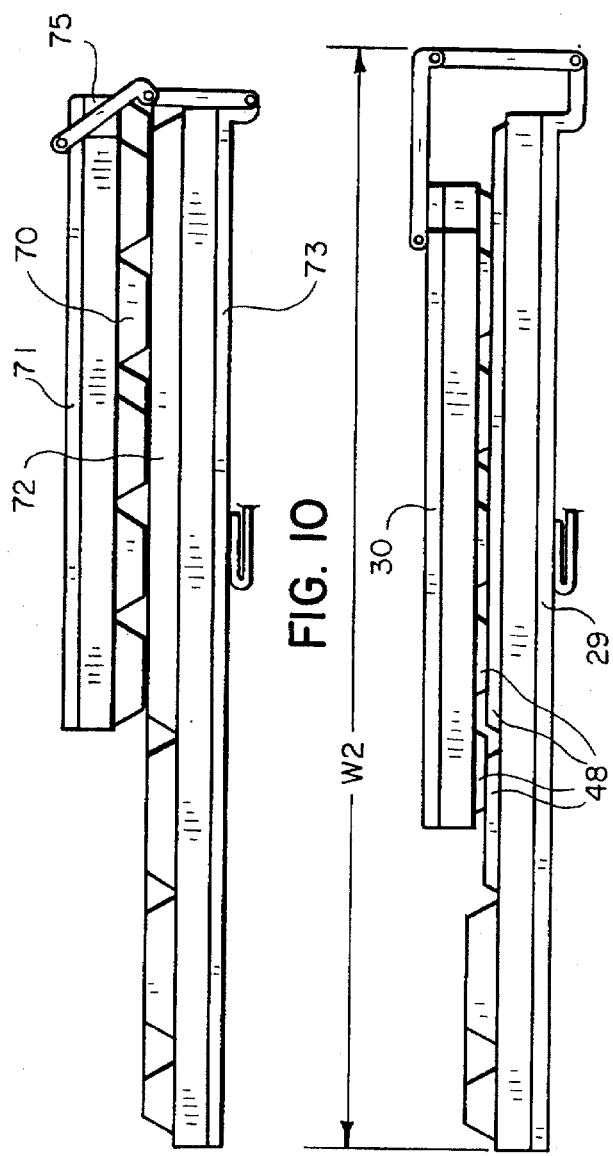

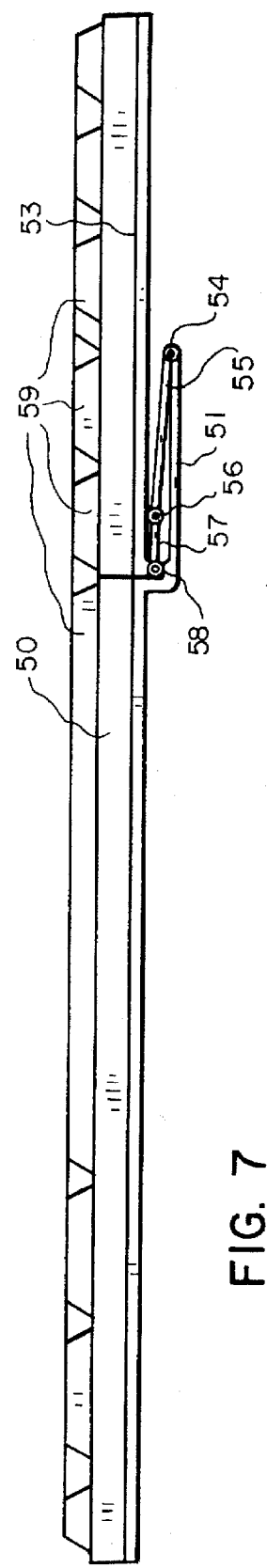
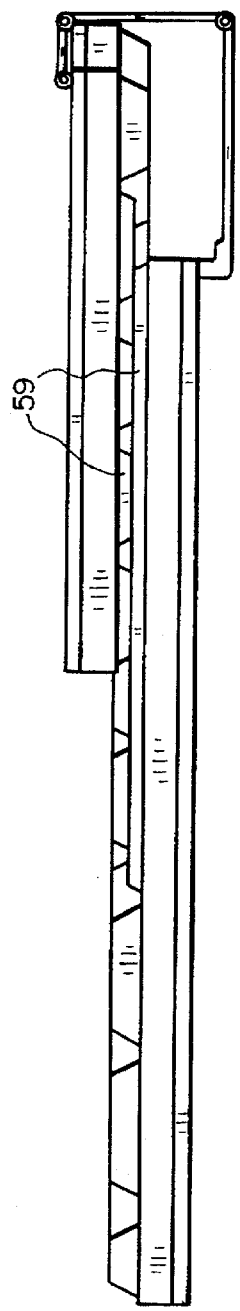
FIG. 7
FIG. 8

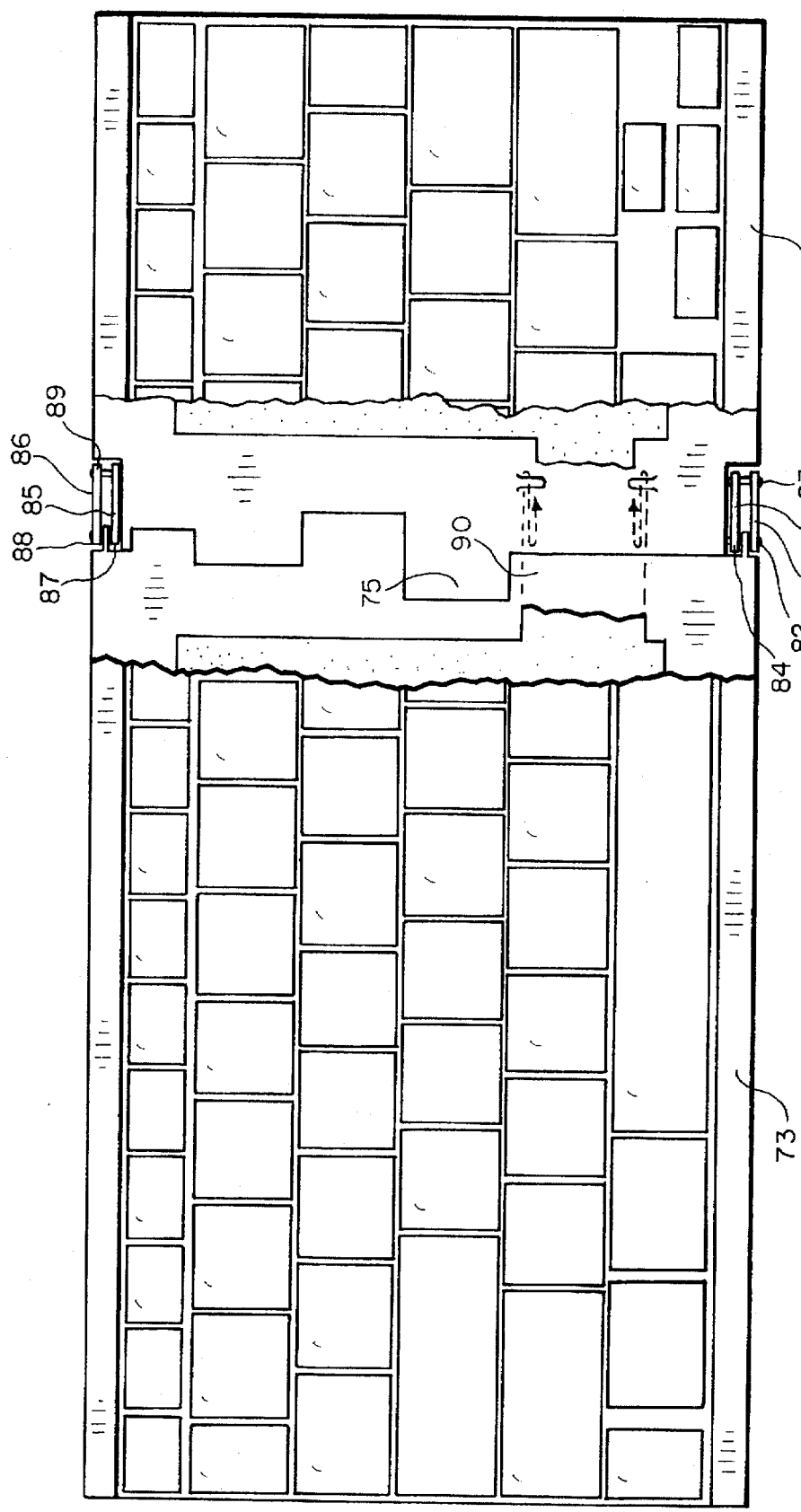

METHOD AND APPARATUS FOR REDUCING AT LEAST ONE DIMENSION OF A COMPUTER KEYBOARD FOR TRANSPORTATION AND STORAGE

BACKGROUND OF THE INVENTION

1. Field of the Invention

The invention relates to methods and apparatus for reducing a dimension of a computer keyboard for storage or transport. The invention specifically relates to ways of folding a full-sized keyboard into a notebook computer, such that the size of the notebook computer may be reduced.

2. The State of the Art

Manual typewriters had keyboards having large, widely spaced, keys to allow room for the mechanism of the typewriter and to allow users to strike the keys with the force required to actuate the mechanism.

Many features of todays computer keyboards are traceable to the characteristics of manual typewriters. Among these features are the QWERTY key layout and the size and spacing, of the keys. Many users of computer keyboards were trained on typewriters, or on computer keyboards incorporating the characteristics of typewriter keyboards. When these users purchase portable computers, they strongly prefer to purchase computers having a keyboard that, when in use, has similar key spacing, key size, and layout to the standard-size keyboards on which they were trained. These users also prefer to purchase computers with keyboards having keys that move over a distinct range where the user can feel the key moving as the user strikes the key rather than keyboards having no tactile feedback.

The standard QWERTY key layout of the alphabetic section of keyboards has a staggered arrangement of keys. The keys in the first row, "ZXCVBNM,./", do not line up with the keys in the second row, "ASDFGHJKL;'", which do not line up with the keys in the third row, "QWERTYUIOP []", or those in the fourth, "1234567890-=\" row. This staggered arrangement was dictated by the needs of mechanical typewriters. With typical key-modifier keys located at the ends of the key rows, a standard alphabetic keyboard section requires a space of at least 10.5 inches by 3.5 inches.

Modern electronics allows production of portable computers that are substantially smaller than standard size keyboards. The Hewlett-Packard 95 series machines, and typical electronic organizers such as those made by Casio, are examples of portable computing apparatus insufficiently wide for a standard size, 10.5 inch, conventional QWERTY keyboard section. These machines are typically manufactured with a keyboard having small, tightly spaced, keys that are not acceptable to many users trained on standard keyboards.

U.S. Pat. No. 5,141,343, issued to me in August of 1992, describes a linearly compressible keyboard wherein the key pitch is reduced to permit storage of the keyboard in a smaller space than the 10.5 inches of a standard keyboard.

U.S. Pat. No. 5,187,644, issued to Crisan in February, 1993, describes a notebook computer wherein the keyboard has a pair of hinged flaps. The flaps of Crisan each have a hinge above the top surface of the key array, and fold inwardly. The flaps are supported by foldout keyboard supports that extend from each flap to a notch on the side of the notebook computer body. The flaps of Crisan are illustrated, in his FIG. 4, as incorporating numeric pad keys and function keys, with the alphabetic key array remaining in one section. The hinged flaps of Crisan do not produce a keyboard of standard layout that folds in the alphabetic, QWERTY, section because the hinge of Crisan is incompatible with the staggered arrangement of the keys in the various rows of the standard QWERTY keyboard layout.

U.S. Pat. No. 5,267,127, issued to Pollitt in November of 1993, describes a keyboard that is fabricated as two sections, equivalent to a keyboard cut through the QWERTY section of the keyboard. These section are pivoted together at the top of the keyboard. The pivot joint is mounted in a straight sliding track on top of the notebook computer. For use, the sections are aligned to form the same array as a standard keyboard, with the pivot slid to the rear of the computer top. For storage, the sections remain in one plane, each rotated ninety degrees, such that the top of the left section is adjacent to the top of the right section, and the pivot slid to the front of the computer top.

U.S. Pat. No. 3,940,758, issued to Margolin in February of 1976, describes a keyboard for a calculator that is fabricated in three sections. The Margolin keyboard includes a QWERTY section that is divided into two portions. Each section of Margolin's keyboard has an electrical connector that mates with the adjoining section when the three sections are arranged in line in operative position. The sections of Margolin seem to be interconnected by a linkage comprising two hinges having sliding arrangements and a link at each side of the keyboard. This linkage permits the keyboard sections to be separated, and stacked vertically. Margolin, however, does not suggest that the keys of the sections be compressed and retained by a latch in compressed position for storage, and the edges of the sections of Margolin's keyboard remain exposed to the elements and may be subject to damage when the calculator is folded into the storage position. Finally, Margolin seems to lack means for retaining the keyboard sections in proper alignment and sufficiently close to each other to make proper electrical contact with each other when in operative position.

While the thickness of keyboards varies, it is frequently greater than a centimeter. The thickness is the distance from the top of the keys in the uncompressed or unactivated state to the bottom of the keyboard subassembly. The key travel is the distance that a key moves when pressure is applied to a key. Typical key travel is in the range of from two to four millimeters, with many keyboards in the 2.5 to 3.5 millimeter range.

SUMMARY OF THE INVENTION

According to the invention, a keyboard of standard width is folded to vertically stack separate keyboard sections one above the other to require less width for storage than standard width unfolded keyboard. With keyboard sections stacked vertically, the sections can be pressed against one another to depress the keys, thereby reducing or compressing the thickness of each keyboard section and reducing the thickness of the folded keyboard for storage. In this way, a keyboard of standard width can be stored in a space of as little as six inches width, and with the keys depressed to compress the thickness of the stacked keyboard sections in less volume than is required for an uncompressed keyboard. The entire computer when folded may occupy a space no larger than that occupied by a thick paperback book.

The preferred embodiment of my keyboard incorporates a keyboard having a full-width triple-hinge arrangement interconnecting a main and a folding section of the keyboard. The folding section of the keyboard is positioned face down, above the main section of the keyboard for storage, with the key travel compressed for storage. The folding section is positioned face up, adjacent to and interlocking with the main section, and both the main and folding sections are retained by a slot in the computer housing when the keyboard is in operative position. Power and signal connections to the folding section are made through contacts that make connection when the keyboard is deployed in operative position. Alternatively, a flexible circuit may be used to make connection with the folding section of the keyboard.

Alternatively, folding supports may be used to support the keyboard in operative position. This alternative does not require a keyboard retaining slot in the computer housing.

Still another alternative incorporates a partial width triple hinge arrangement, which permits folding the folding section above the main section but is less stable than the full-width triple hinge arrangement.

Yet another alternative embodiment incorporates a single hinge whereby the folding section of the keyboard may fold downwardly beneath the main section. Key travel of both the main section and the folding section is then taken up for storage as the computer is folded into the storage position.

BRIEF DESCRIPTION OF THE DRAWINGS

The best mode presently contemplated for carrying out the invention is illustrated in the accompanying drawings, in which:

FIG. 5, a front view of the keyboard of the preferred embodiment of FIGS. 2 and 3, with the folding section in storage position and the keys of the keyboard compressed;

FIG. 6, a fragmentary vertical section of a keyboard taken on the line 6—6 in FIG. 1;

FIG. 7, a front view of a second alternative embodiment of the present invention, with the keyboard in the operative position;

FIG. 8, a front view of the second alternative embodiment of the present invention, with the keyboard in the storage position;

FIG. 10, a front view of the third alternative keyboard with the folding section positioned vertically above the main section of the keyboard, but with the keys of the keyboard not compressed for storage;

FIG. 11, a top plan view of the third alternative keyboard in operative position, partially cut away to show the crenelated boundary between the main and folding sections of the keyboard, and showing the outline of the flexible circuit used to connect the folding section to the main section;

DETAILED DESCRIPTION OF THE ILLUSTRATED EMBODIMENTS

Figure 1:
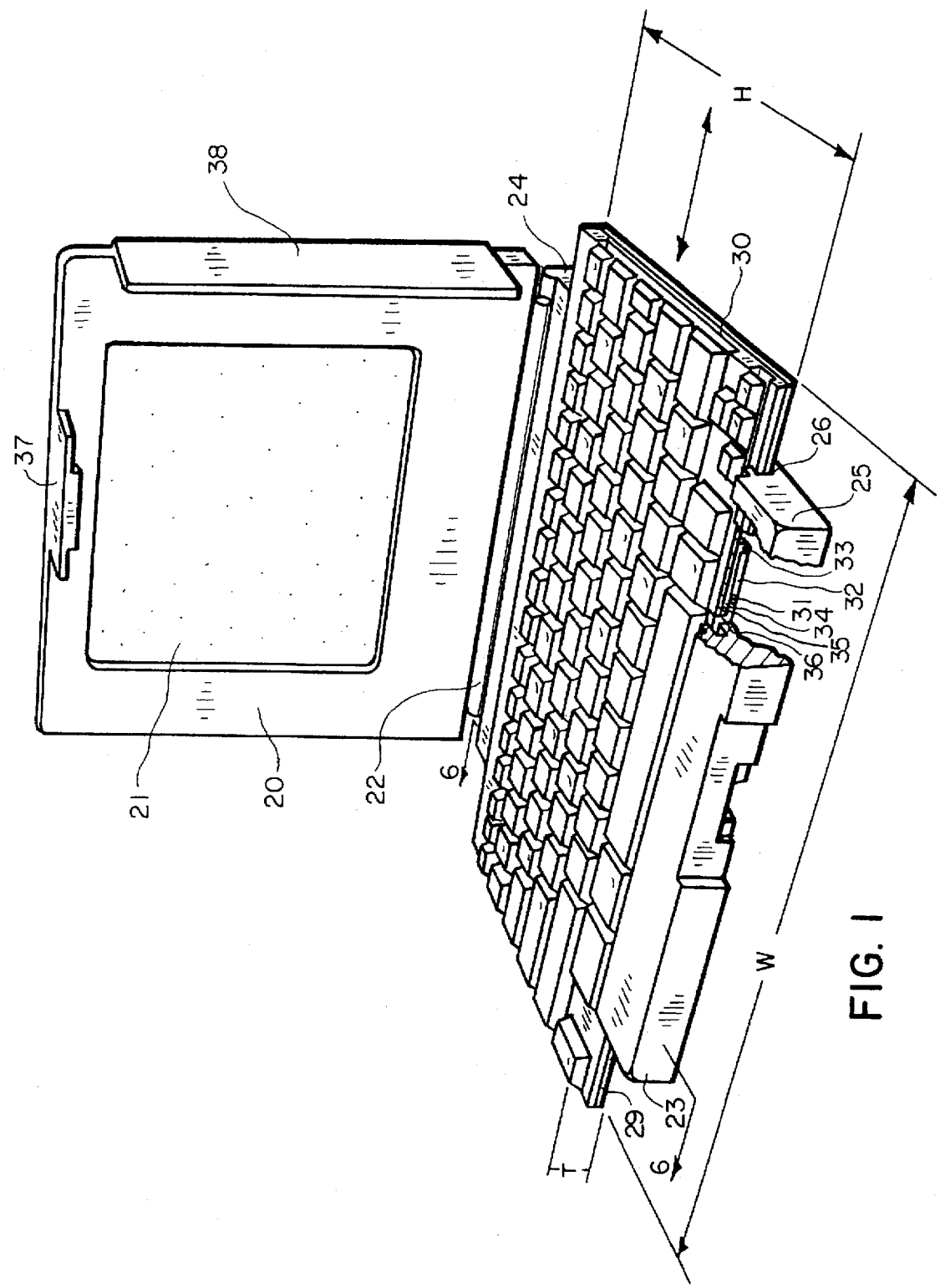
FIG. 1 is a perspective view of a portable computer having the preferred embodiment of the present invention, a two section keyboard stabilized in operative position by engagement with a slot in the computer housing, where one section of the keyboard may fold upwardly with a triple hinge for storage.

A portable computing device incorporating the keyboard of my invention is shown in FIG. 1. The computer has a top portion 20, normally incorporating a liquid crystal display device 21. The top portion 21 attaches through a top hinge 22 to the back of a base portion or computer housing 23. Base portion 23 is formed as a wide, shallow, "U", with a back upright arm 24 and a forward upright arm 25. The inner side of each upright arm is formed with a keyboard retainer slot 26 within which the keyboard is disposed.

The keyboard of the portable computing device comprises a main section 29 and a folding section 30. Both the folding section or portion 30 and the main section 29 of the keyboard are retained in the keyboard retainer slot 26 when the keyboard is in operative position, as shown in FIG. 1. The folding section 30 is attached to the main section 29 of the keyboard through a triple hinge arrangement. The triple hinge arrangement comprises a first hinge 31, a first arm 32, a second hinge 33, a second arm 34, and a third hinge 35. To allow for the space required for the hinges, the triple hinge arrangement is offset from the main section 29 of the keyboard by a third arm 36.

The top portion 20 of the computer has a latch 37 that engages with the base portion 23 to hold the computer in a closed position for storage, and a keyboard slot cover 38 that covers the keyboard retainer slot 26 when the computer is in the closed storage position.

Figure 2:
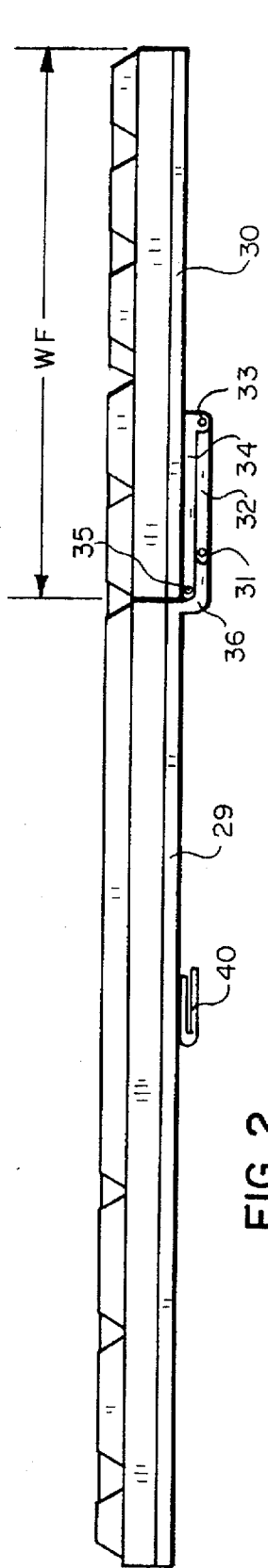
FIG. 2, a front view of the keyboard of the preferred embodiment, deployed in operative position, but apart from the computer.
Figure 3:
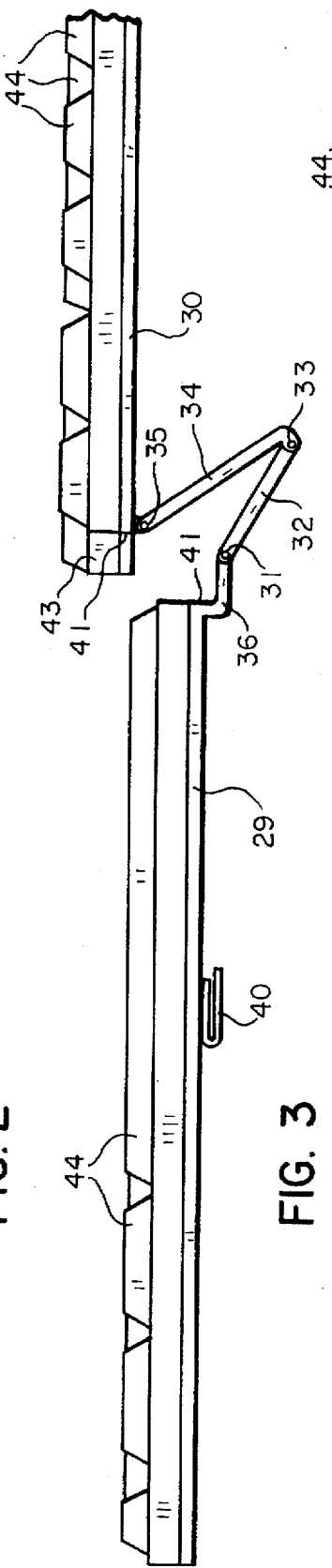
FIG. 3, a front view of the keyboard similar to that of FIG. 2, with the folding section separated from the main section of the keyboard for folding, and showing the triple hinge arrangement and the contacts that power and communicate with the folding section.

Beneath the keyboard is a flexible printed circuit keyboard connector 40 (FIG. 2) that connects the keyboard to the base portion 23 to power the keyboard and convey signals from the keyboard to the remainder of the computer. Flexible printed circuit 40 flexes to allow the keyboard to slide in retaining slot 26 while maintaining electrical connection between the keyboard and the base portion 23. An optional catch (not shown) may be provided to prevent undesired sliding of the keyboard in the slot. No catch is necessary if the dimensions of the slot 26 and that portion 26a of the keyboard which slides in the slot are reasonably close, such that substantial friction is present. Between the main section 29 and the folding section 30 of the keyboard are electrical contacts 41 (FIG. 3) that provide power to, and communicate signals from, the folding section 30 of the keyboard. These key-pressed signals are transmitted through the main section 29 to the remainder of the computer through the flexible printed circuit keyboard connector 40, which also transmits key-pressed signals from the main section of the keyboard. Also visible in FIG. 3 are the interdigitated portions 43 of the folding sections of the keyboard, and a plurality of keyboard key tops 44.

The triple hinge arrangement (31, 32, 33, 34, and 35) linkage is designed to retain folding section 30 in position against the main section 29 such that contacts 41 are engaged so long as both the main and folding sections are both engaged in retaining slot 26. This effect of the linkage results because engagement of the sections in the retaining slot prevents vertical relative movement between the sections.

Figure 4:
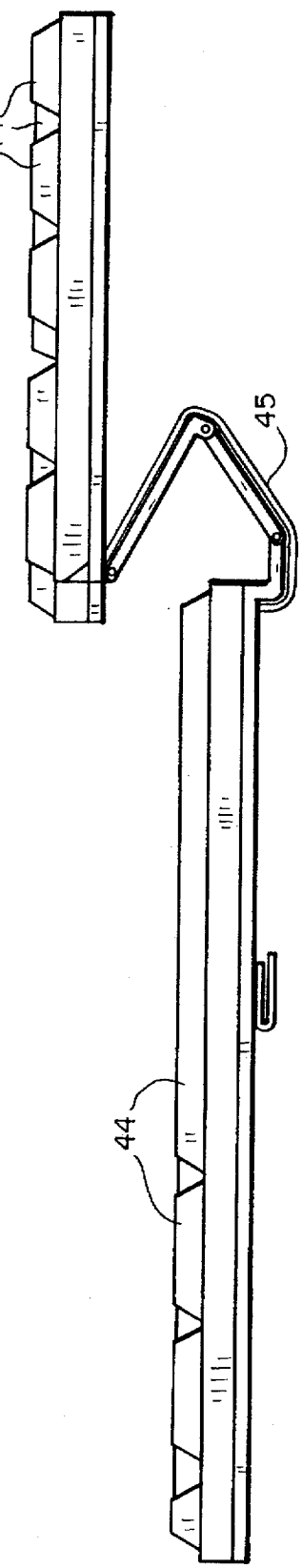
FIG. 4, a front view of a first alternative embodiment of the present invention, showing a flexible circuit connection for powering and communicating with the folding section.

In an alternative embodiment (FIG. 4) of the present invention, a flexible printed circuit 45 interconnects the main and folding sections of the keyboard in place of the contacts 41. Similarly, electrical contacts (not shown) engaging between the main section 29 of the keyboard and the base portion of the case 23 may also provide electrical connection for key-pressed signals and power between the keyboard and the remainder of the computing device. It is also possible to install a small battery in either or both of the keyboard sections, and to optically transmit key-pressed signals to the remainder of the computing device.

The folding section 30 of the preferred embodiment of the present invention folds into a compressed position (FIG. 5) such that the key tops of the folding section 30 are in contact with and compress those of the main section 29 and hold them in the compressed state 48. When the computer top portion 20 is latched such that the computer is held in the closed position, the top portion holds the folding section 30 in the compressed position, while keyboard slot cover 38 protects the mating surfaces of the main section 29 and folding section 30. In this embodiment, in the storage position the folding section is stacked vertically adjacent to, and above, the main section of the keyboard.

The length of the second arm 45 is approximately equal to the height of the folding section 30 plus the height of the main section 29 with their keys compressed, plus the thickness of the third arm 36. The length of the third arm is sufficient to protect the contacts 41 from contact with the second arm 34.

The arms and hinges interconnecting the main 29 and folding 30 sections of the keyboard preferably run across the entire height H (FIG. 1) of the keyboard, except for that portion engaged in the keyboard retaining slot 26. This provides a stable keyboard surface. A less stable, but functional, keyboard surface can be obtained with hinges and arms that extend only partially across the height H of the keyboard. My keyboard incorporates a row of half-height function keys, such that in the operative position my keyboard height H is about four inches, my keyboard's width W is ten and one half inches, its thickness T is eleven millimeters, and the width WF (FIG. 2) is about four inches. Key travel is approximately 2.5 millimeters. In the folded position, my keyboard has a width W2 (FIG. 5) of approximately six and three fourths inch.

A second alternative embodiment (FIG. 7) of my keyboard has a main section 50 having an extended attachment arm 51 for attaching a folding section 53. As with the preferred embodiment, three hinges are used. A first hinge 54 joins the attachment arm 51 to a first joint arm 55, a second hinge 56 joins the first joint arm 55 to a second joint arm 57, and a third hinge 58 joins the second joint arm 57 to the folding section 53. In folded position (FIG. 8) the key tops 59 of both the main and folding sections are held compressed, as with the preferred embodiment. The top portion of a case similar to that of FIG. 1 is folded against and latched into place against the back of the folding section 53 to hold the key tops 59 in the compressed position. This second alternative embodiment is not as desirable as the preferred embodiment because the folding section 53 in folded position (FIG. 8) takes somewhat more space than with the preferred embodiment.

Figure 9:
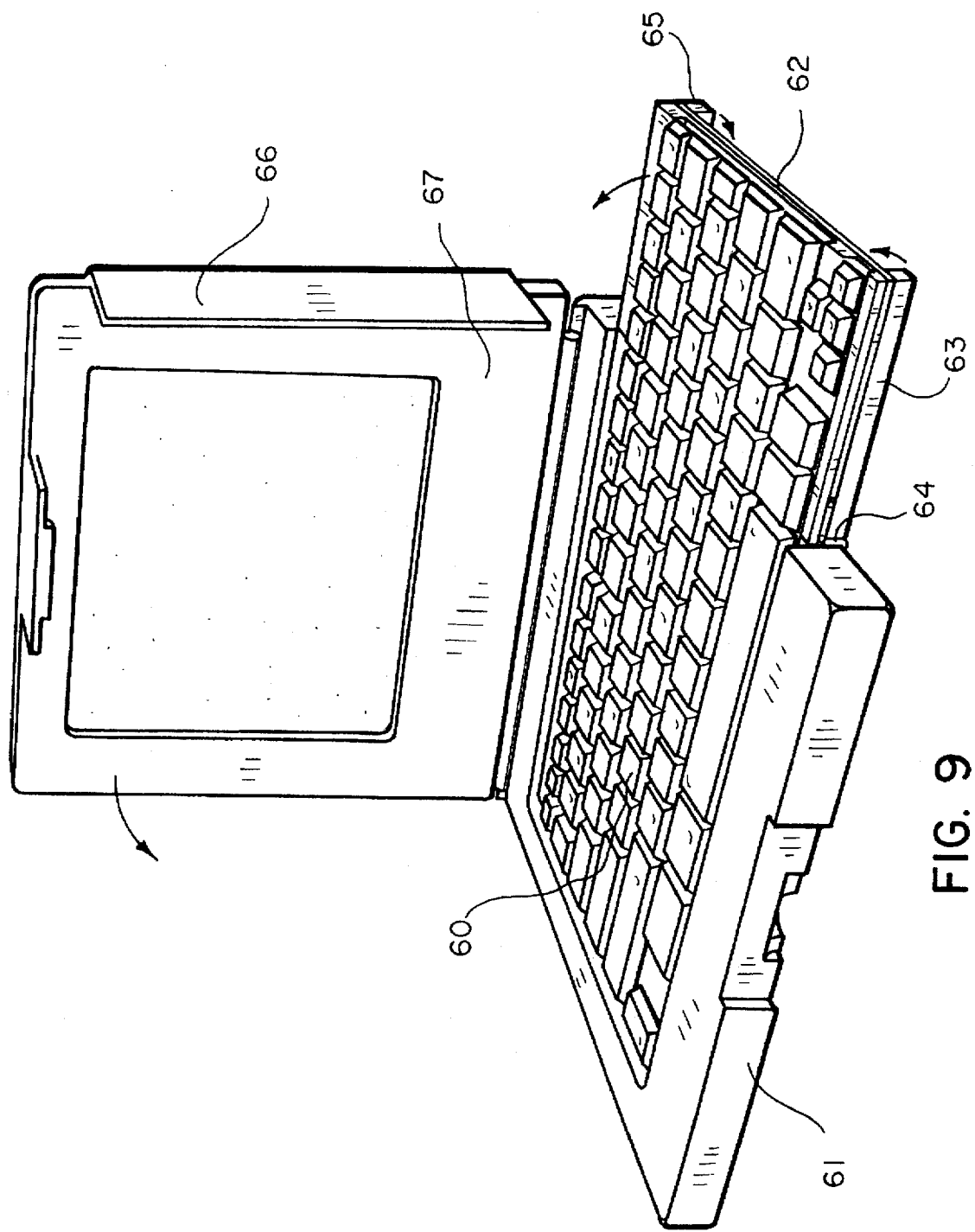
FIG. 9, a perspective view of a portable computer having a third alternative keyboard supported in operative position by a pair of foldout keyboard supports.

In a third alternative embodiment (FIG. 9), the arrangement of arms and hinges is identical to that of the preferred embodiment. The main section 60 of the keyboard is, however, fixed to the bottom portion of the computer case 61. The folding section 62 is supported in operative position by a first foldout arm 63, attached to the bottom portion of the computer case 61 by a hinge 64 and a second foldout arm 65, also attached to the bottom portion of the computer case by a hinge (not shown). When the folding section 62 of the keyboard is in folded position (not shown), the foldout arms fold flat against the end of the computer case 61. Alternatively, a foldout support arm may be hinged to the bottom of a keyboard section and folded down to hold the keyboard section in operative position. The ends of the keyboard and the foldout arms are covered by a keyboard protector 66 projection on the top portion of the computer case 67 when the top portion of the case 68 is placed in a closed position (not shown). A catch (not shown) holds the folding section 62 of the keyboard to the foldout arms 63 to stabilize the folding section when in the operative position.

The third alternative embodiment of my keyboard also hinges to a closed position (FIG. 10) with keytops 70 of the folding section 71 in contact with the keytops 72 of the main section 73. In this embodiment, however, the arms and hinges interconnecting the folding section 71 and the main section 73 are not continuous across the keyboard. These arms and hinges are interrupted such that the interdigitated portion 75 of the folding section 71 may project through the arms and hinges when the keyboard is in the folded position.

As a result of this interruption, there are two forward arms 80 and 81 (FIG. 11), with three forward hinges 82, 83, and 84. Similarly, there are two rear arms 85 and 86, with three rear hinges 87, 88, and 89. A flexible printed circuit 90 interconnects the folding section 71 with the main section 73.

Figure 12A:
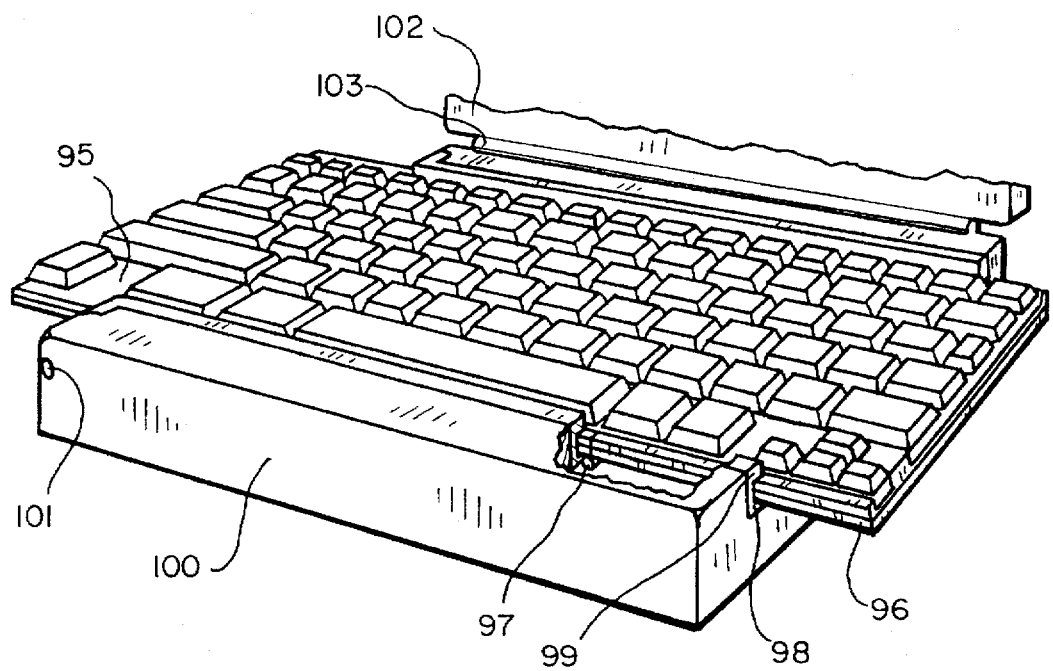
FIG. 12A, a partial perspective view of a fourth alternative embodiment of the present invention, with the keyboard in operative position with both the main section and the folding section in a stabilizing slot of a keyboard retainer.
Figure 15:
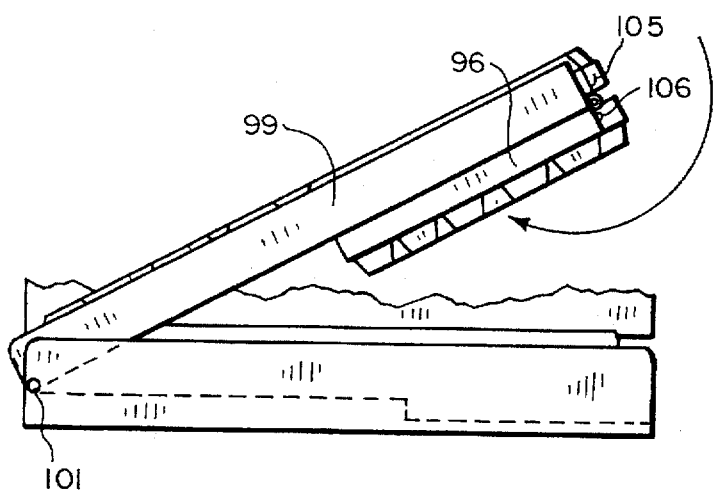
FIG. 15, a front view of the fourth alternative embodiment, with the folding section of the keyboard folded beneath the main section.

In a fourth alternative embodiment of the present invention has a keyboard having a main section 95 and a folding section 96 interconnected by one hinge 97 therebetween (FIG. 12A). The hinge is on the bottom of the keyboard, and comprises a hinge of the piano-hinge type. The keyboard slides horizontally in a retaining slot 98 in a keyboard retainer 99. The keyboard retainer 99 is attached to a housing base portion 100 by means of a pivot 101. Housing base portion 100 is attached to a housing top portion 102 by a hinge 103. The main section 95 of the keyboard is electrically connected to the base portion 100 by a flexible printed circuit cable 104. The folding section 96 of the keyboard is electrically connected to the main section 95 of the keyboard by electrical contacts 105 and 106 (FIG. 15). It is also possible to connect the main section 95 to the folding section 96 with a flexible printed circuit.

Figure 12B:
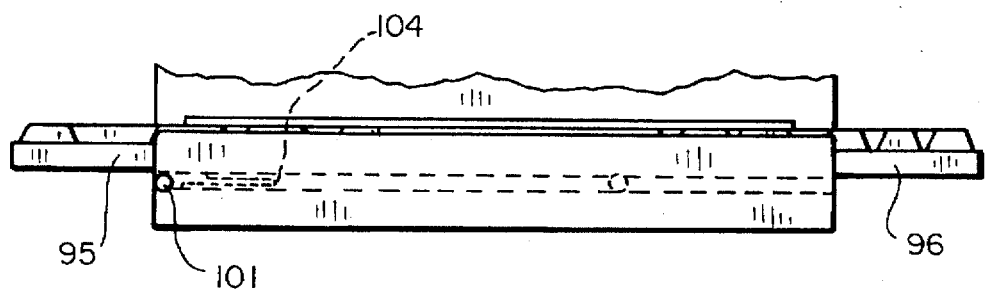
FIG. 12B, a front view of the fourth alternative of FIG. 12A, with the keyboard in operative position.
Figure 13:
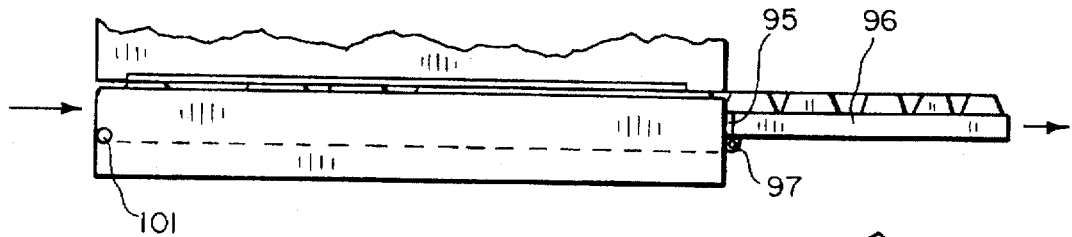
FIG. 13, a front view of the fourth alternative embodiment, with the keyboard slid to the right to disengage the folding section from the stabilizing slot.
Figure 14:
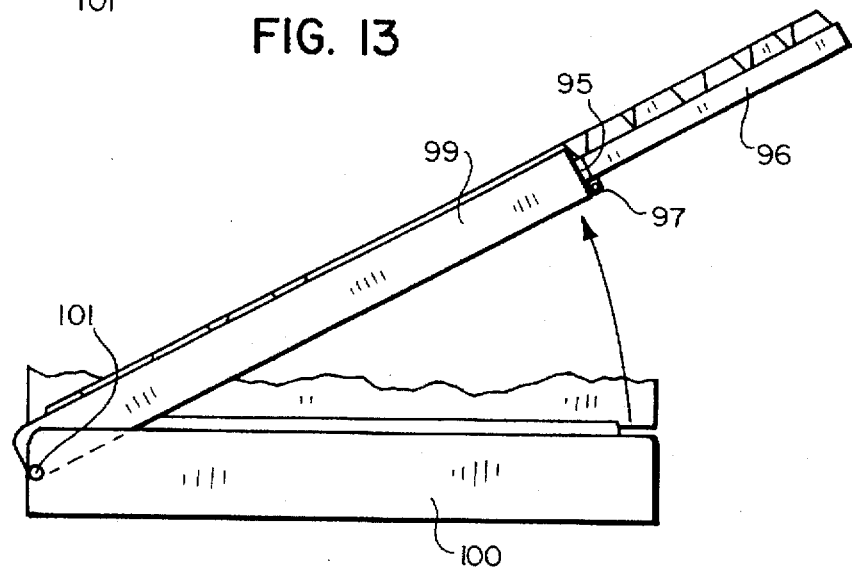
FIG. 14, a front view of the fourth alternative embodiment, with the keyboard retainer pivoted upwardly to permit folding of the folding section.
Figure 16:
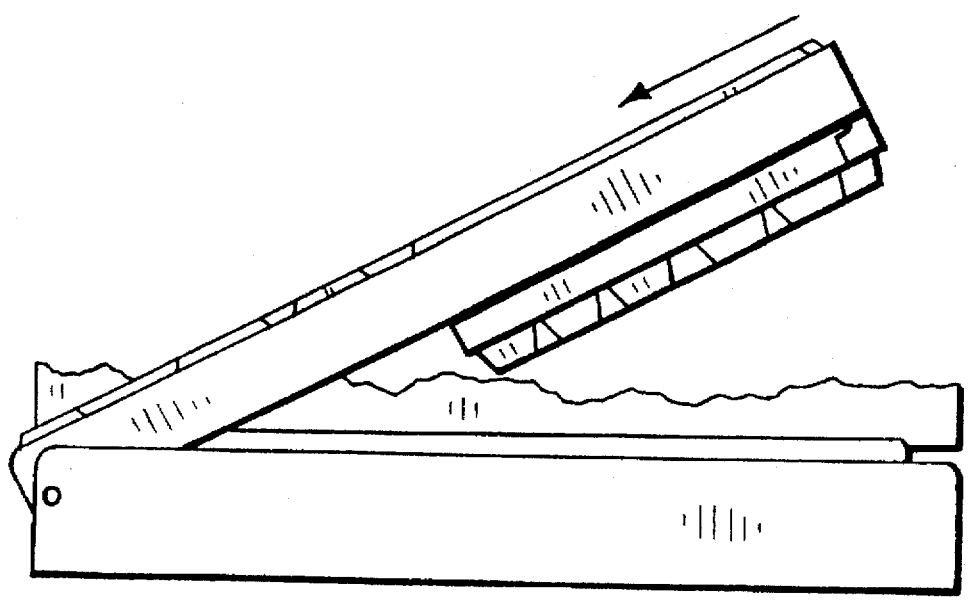
FIG. 16, a front view of the fourth alternative embodiment, with the keyboard repositioned for closing the keyboard retainer.
Figure 17:
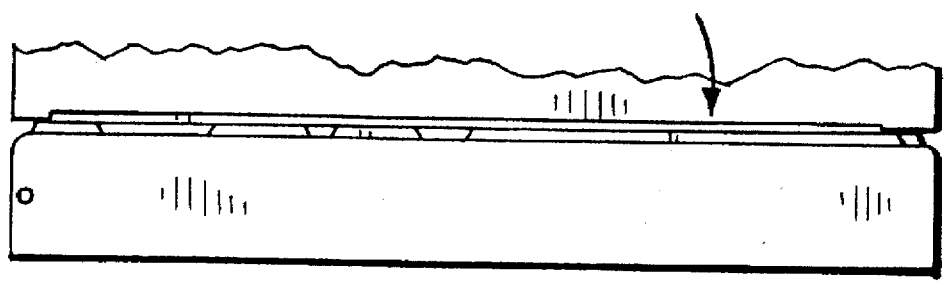
FIG. 17, a front view of the fourth alternative embodiment, with the keyboard retainer closed and the keyboard in storage position.

Transformation of the fourth alternative from the operative position depicted in FIGS. 12A and 12B to the folded position depicted by FIG. 17 is accomplished by first sliding the keyboard, including both the main section 95 and the folding section 96, in the direction of the folding section 96 as shown in FIG. 13. The keyboard retainer 99 is then pivoted upwardly relative to the base 100 as shown in FIG. 14. The folding section 96 of the keyboard is then folded downwardly beneath the main section 95 as shown in FIG. 15. The keyboard may then be repositioned slightly as shown in FIG. 16 so that it will fit within the case, and the keyboard retainer 99 is pivoted downwards with the keyboard into a storage position as shown in FIG. 17. When the keyboard is pivoted downwards into storage position, the keys of the folding section 96 are compressed such that the travel of the keys is taken up. Similarly, the keys of the main section 95 are compressed by the top portion 102 of the housing when the top portion of the housing is folded across the top of the main section 95 of the keyboard for storage. In this alternative embodiment, the folding section is in the storage position vertically adjacent to, and beneath, the main section of the keyboard.

Yet another device (not shown) for mechanical interconnection between a keyboard folding section and a main section, where the keys of the folding section and the main section are in contact when the keyboard is folded for storage, is an arrangement of two hinges and two sliders, with two catches. To fold a keyboard of this type, the user first releases the catches to allow the sliders to extend, extends the slider, thereby separating the main section from the folding section sufficiently far that the hinges are clear of the interdigitated portions of the keyboard. The user then bends the hinges to place the keyboard into a storage position.

While the illustrations portray a keyboard having a folding section on the right side, folding sections on the left side are equally possible and are equivalent to those portrayed.

The keyboard retainer 99 of the fourth alternative embodiment (FIG. 12A) can be built as a single component, having a retaining slot 98 in each of two rails where the rails are joined together and attached to the base portion 100 of the case by a pivot on one end as shown, or may be pivoted to the base portion 100 by a hinge at the rear of the base portion 100 of the housing, adjacent to the hinge 103 that attaches the top portion 102 of the housing. The keyboard retainer 99 may also be fabricated as two separated rails independently hinged to the base portion 100 of the housing at one side of the housing.

Figure 18A:
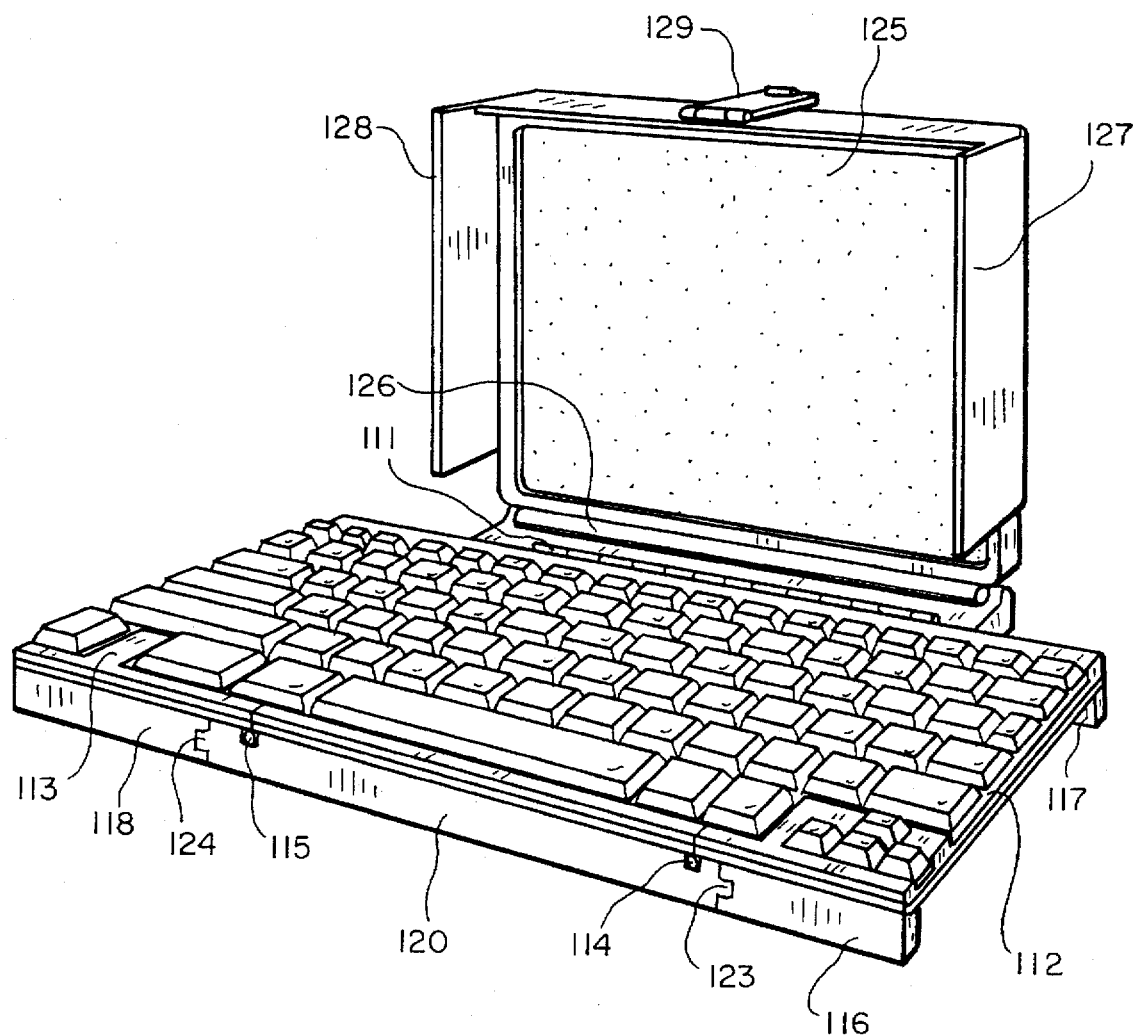
FIG. 18a, a perspective view of a fifth alternative embodiment, with the keyboard in operative position.
Figure 18B:
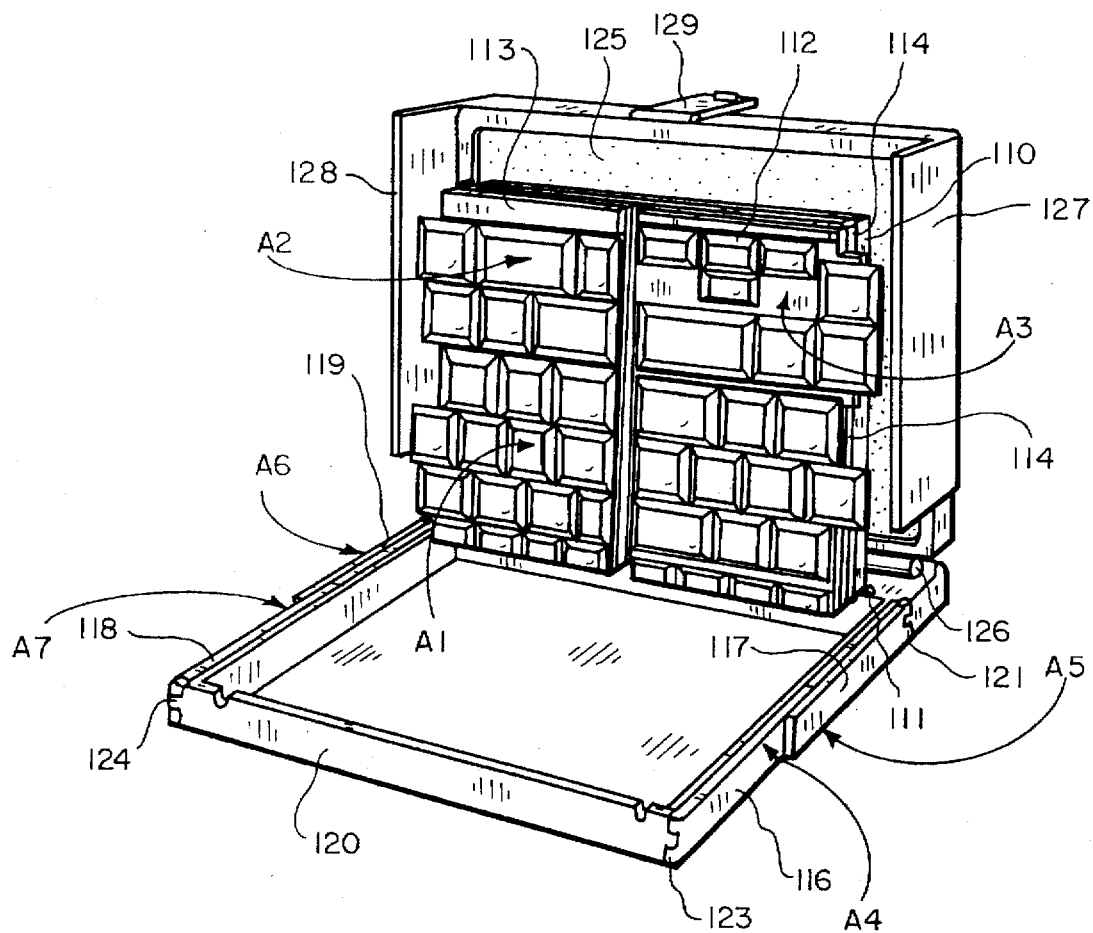
FIG. 18b, a perspective view of the fifth alternative embodiment, showing the keyboard upturned and partially folded, with the keyboard supports folded.
Figure 18C:
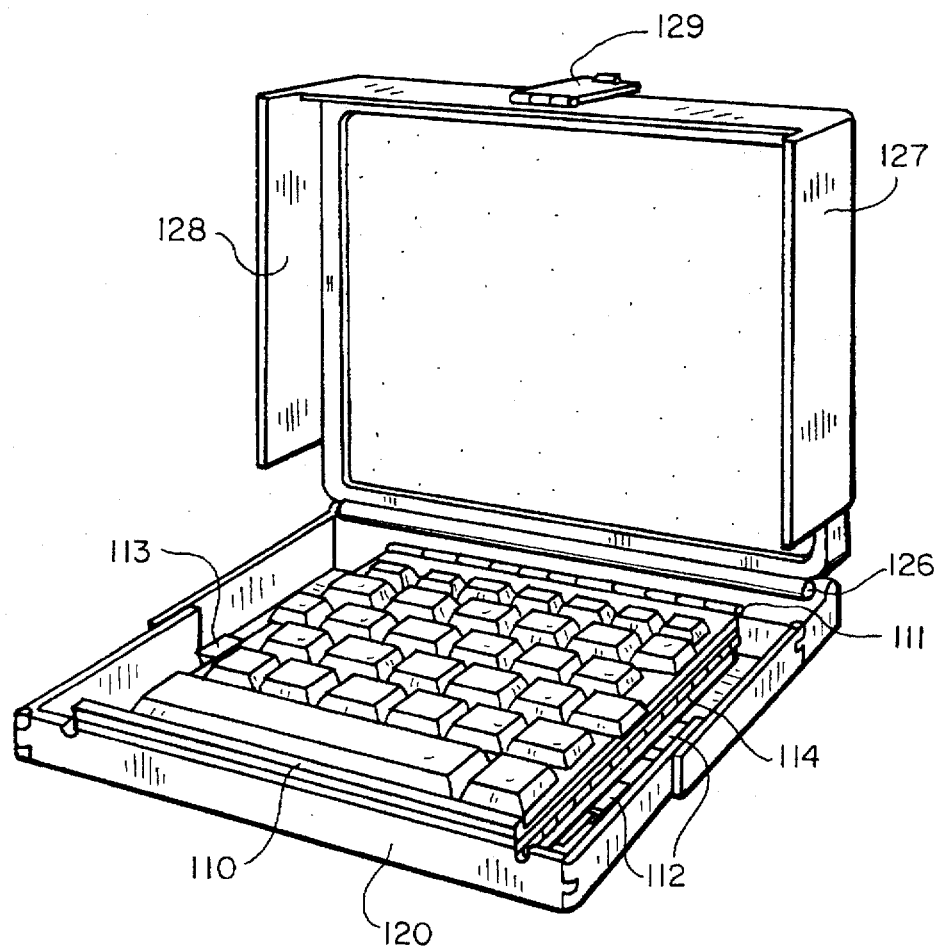
FIG. 18c, a perspective view of the fifth alternative embodiment, showing the keyboard positioned ready for closing the top portion of the computer case.
Figure 18D:
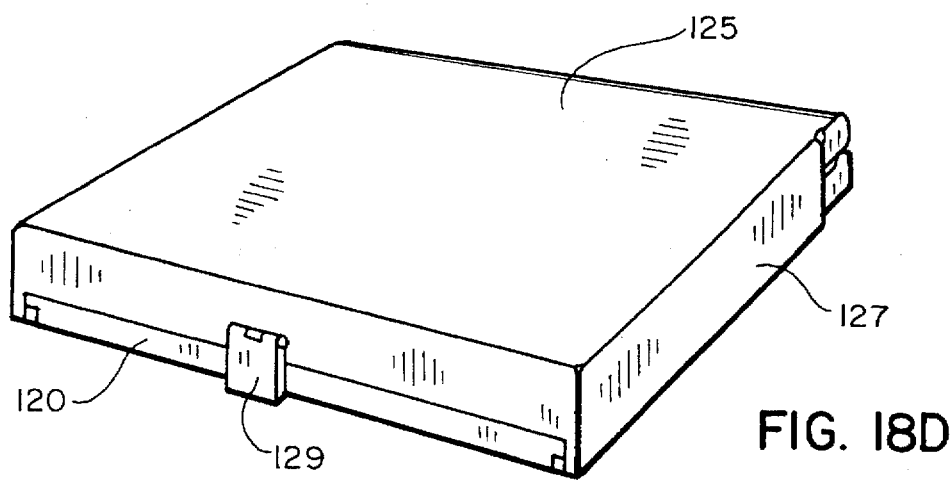
FIG. 18d, a perspective view of the fifth alternative embodiment, showing the computer with the top portion of the computer case and the keyboard in storage position.

Yet another, fifth alternative, embodiment has a keyboard having three sections. The center, or main, section 110 (FIG. 18A) is hinged by a hinge 111 at the rear of the keyboard to the bottom portion of the case 120. Two folding sections are provided, 112 and 113, each hinged by a single hinge 114 and 115 at the bottom of each end of the main section. In operative position, the folding sections of the keyboard are supported by hinged foldout supports 116, 117, 118, and 119 similar to those of 63 on FIG. 9. Should the front supports be lower than the rear supports (not shown), by an amount approximately equal to the thickness of the keyboard folding sections 112 and 113, the keyboard will have a slope to it in operative position. Alternatively, a slideout support may be used. A user folding this embodiment for storage first raises the keyboard rotating it along arc A1 upwardly on the hinge 111 (FIG. 18B) attaching the main section of the keyboard to the bottom portion of the case 120. The folding, or wing, sections are then folded along arcs A2 and A3 to a position in front of the main section, and the keyboard is then lowered such that the main section is in its starting position, with the folding sections beneath it (FIG. 18C), thereby compressing the keys of the folding sections 112 and 113 against the case base portion 120.

The foldout supports 116, 117, 118, and 119 are then folded against the lower portion of the case 120, first by folding forward supports 116 and 118 towards the rear of the case along arcs A7 and A4, and then by folding rear supports 117 and 119 towards the front of the case along arcs A5 and A6. It should be noted that the hinges 121 and 122 for the rear foldout supports 117 and 119 are spaced a bit further apart than are the hinges for the forward supports 123 and 124. Folding of the computer for storage is completed by folding the top portion of the computer case 125 downwardly on the hinge 126 attaching it to the base portion of the case 120, thereby compressing the keys on the main portion of the keyboard 110 and covering the keyboard hinges, 114 and 115, and the ends of the main and folding keyboard sections with case top portion keyboard protector portions 127 and 128. Catch 129 is then folded down on its hinge and engaged with the base portion of the case 120, to retain the computer in folded position.

While the illustrations portray a keyboard having a single folding section and a main section, the present invention is applicable to keyboards that have a plurality of folding sections. For example, a keyboard can be built having a central main section, a right-hand folding section one-third of the width of the keyboard that folds to a storage position above the main section with a triple-hinge in the manner of the preferred embodiment (FIG. 5), with a left hand folding section one third of the width of the keyboard that folds to a storage position below the main section with a single hinge, in the manner of the fourth alternative embodiment (FIG. 15). A keyboard 11 millimeters thick, having 3 millimeters of key travel, folded in this manner could fold for storage in a space approximately four inches wide, by three and a half inches deep, by 24 millimeters (about one inch) high.

In the illustrated embodiments, the keyboard folds at a point adjacent to the spacebar. The spacebar, or space key, may be split into multiple sections of a space key, with one section of the space key on the main section and another on the folding section. With a split spacebar, the keyboard may fold at a point between the ends of a normal spacebar.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A method for reducing the width of a keyboard from a first width of the keyboard in operative position to a second width of the keyboard in a storage position, where the keyboard is an electronic type for use with portable computing devices, comprising:

providing a keyboard comprising a plurality of keyboard sections including at least a first keyboard section and a second keyboard section, each keyboard section having a top face from which a plurality of keys extend, an opposite bottom face, and opposite sides, and where the operative position of the keyboard has the sections disposed side-by-side in a line;

providing a component having a first slot, the first and the second keyboard sections being slidably engaged in the first slot when the keyboard is in operative position;

sliding the first keyboard section relative to the component having the first slot until the first keyboard section disengages from the first slot;

folding the keyboard such that a face of the first keyboard section selected from the group consisting of the top face and the bottom face is adjacent to a face of the second keyboard section selected from the group consisting of the top face and the bottom face to place the keyboard in storage position.

2. The method of claim 1, further comprising the step of collectively compressing the keys of the keyboard sections to reduce the thickness of the keyboard sections while placing the keyboard in storage position.

3. The method of claim 1 wherein the first and the second keyboard section are mechanically interconnected by an interconnection mechanism.

4. The method of claim 3, wherein the interconnection mechanism comprises a hinge at a face of the keyboard.

5. The method of claim 4, wherein the interconnection mechanism comprises a plurality of hinges such that no hinge is at or above the top face of a keyboard section, and the interconnection mechanism retains the keyboard sections adjacent to each other with little or no play when the keyboard is in operative position, and wherein the top face of the first keyboard section is adjacent to the top face of the second keyboard section when the keyboard is in storage position.

6. A keyboard assembly for portable computing devices, the keyboard assembly having an operative position and a storage position, the keyboard assembly comprising:

a first and a second keyboard section each having a plurality of keys;

a mechanical interconnection device interconnecting the first and the second keyboard section in line for an operative position, where the mechanical interconnection device is operable to permit the first and second keyboard section to be moved to a position vertically adjacent to each other for a storage position;

apparatus for electrically interconnecting the first and the second keyboard section when the keyboard is in operative position;

apparatus for electrically connecting the first keyboard section to the portable computing device;

a component having a slot within which the first and second keyboard sections are slidably engaged when the keyboard is in operative position; and wherein when the keyboard is in storage position the first keyboard section is engaged within the said slot and the second keyboard section is not engaged in said slot.

7. The keyboard of claim 6, wherein the apparatus for electrically interconnecting the first and the second keyboard sections comprises a plurality of electrical contacts that engage when the keyboard is in operative position.

8. The keyboard of claim 6, wherein the apparatus for electrically interconnecting the first and the second keyboard sections comprises a flexible conductor disposed between the sections.

9. The keyboard of claim 6 wherein the component having a slot is attached to the portable computing device with a pivot.

10. The keyboard of claim 6 wherein the component having a slot is a top portion of a case of a portable computing device.

11. The keyboard of claim 6, wherein the mechanical interconnection device comprises at least one element comprising three hinges and two arms.

12. The keyboard of claim 6 wherein the keys of the keyboard sections are held in compressed position when the first and the second keyboard sections are positioned vertically adjacent to each other for storage.

13. The keyboard of claim 6 wherein the component having the slot serves to support at least two keyboard sections when the keyboard is in operative position.

* * * * *